US009069820B2

(12) United States Patent
Pierce et al.

(10) Patent No.: US 9,069,820 B2
(45) Date of Patent: *Jun. 30, 2015

(54) DATA MANAGEMENT AND PROCESSING SYSTEM FOR LARGE ENTERPRISE MODEL AND METHOD THEREFOR

(75) Inventors: Robert D. Pierce, Albany, CA (US); Michael A. Davis, Scottsdale, AZ (US)

(73) Assignee: SAP SE, Walldorf (DE)

( * ) Notice: Subject to any disclaimer, the term of this patent is extended or adjusted under 35 U.S.C. 154(b) by 970 days.

This patent is subject to a terminal disclaimer.

(21) Appl. No.: 12/186,724

(22) Filed: Aug. 6, 2008

(65) Prior Publication Data

US 2008/0294481 A1    Nov. 27, 2008

Related U.S. Application Data

(63) Continuation of application No. 11/048,949, filed on Feb. 1, 2005, now Pat. No. 7,424,481.

(51) Int. Cl.
G06F 17/30    (2006.01)
G06F 7/00    (2006.01)
G06Q 10/06    (2012.01)
G06Q 30/02    (2012.01)

(52) U.S. Cl.
CPC .... *G06F 17/30516* (2013.01); *G06F 17/30575* (2013.01); *G06Q 10/06* (2013.01); *G06Q 30/0201* (2013.01)

(58) Field of Classification Search
CPC . G06Q 30/02; G06Q 30/201; G06F 17/30516
USPC .......................................... 707/737, 769, 771
See application file for complete search history.

(56) References Cited

U.S. PATENT DOCUMENTS

| | | | |
|---|---|---|---|
| 6,901,403 B1 | 5/2005 | Bata et al. | |
| 7,072,822 B2 | 7/2006 | Humenansky et al. | |
| 7,107,285 B2 | 9/2006 | von Kaenel et al. | |
| 7,213,037 B2 | 5/2007 | Rangadass | |
| 2001/0049690 A1 * | 12/2001 | McConnell et al. | 707/104.1 |
| 2002/0133504 A1 | 9/2002 | Vlahos et al. | |
| 2004/0015418 A1 | 1/2004 | Dooley et al. | |
| 2004/0138942 A1 | 7/2004 | Pearson et al. | |
| 2005/0055275 A1 * | 3/2005 | Newman et al. | 705/14 |
| 2005/0166187 A1 | 7/2005 | Das et al. | |
| 2005/0262119 A1 | 11/2005 | Mawdsley | |
| 2006/0143225 A1 | 6/2006 | Brendle et al. | |

* cited by examiner

*Primary Examiner* — Jeffrey A Burke
(74) *Attorney, Agent, or Firm* — Buckley, Maschoff & Talwalkar LLC (57) ABSTRACT

A computer system performs data processing using a data organizer which parses a primary set of data into predefined sets of data components according to one or more enterprise models. The sets of data components from the data organizer are respectively stored in multiple data sources. The data components may be stored as a binary file or hierarchical file. A plurality of data processing systems execute the enterprise models. A task manager controls which enterprise model executes on each data processing system. The data processing systems access the data components from the data sources which correspond the executing enterprise model. The data components are sent over dedicated communication channels to the data processing systems. Each data processing system may have a data interface, which is configured to receive data from different sources and convert the data into a standard format.

25 Claims, 4 Drawing Sheets

DATA MANAGEMENT AND PROCESSING SYSTEM FOR LARGE ENTERPRISE MODEL AND METHOD THEREFOR

CLAIM OF DOMESTIC PRIORITY

This application is a continuation of U.S. application Ser. No. 11/048,949, filed Feb. 1, 2005, which application is incorporated herein by reference.

FIELD OF THE INVENTION

The present invention relates in general to data processing systems and, more particularly, to a data processing system having data organized for rapid access from dedicated data sources.

BACKGROUND OF THE INVENTION

Data processing systems are known to perform a myriad of useful functions. A data processing system typically comprises a computer system operating one or more software programs. The computer system accesses a data source for the data which it processes. In some cases, the data is stored locally on the computer system. In other cases, the data is stored remotely, e.g., on a database server accessed through a network.

Large retailers have an incentive and desire to leverage information gathered about their business transactions and customer relationships. Retailers want to use data to maximize profit, control inventory, secure market share, and achieve a variety of other business goals. One tool which makes use of such data is the creation of economic models based on the data. The utility of the models is proportioned to, and limited by, the amount of data that can be processed in a given time. Therefore, it is useful to have systems that process transaction and customer data as efficiently and rapidly as possible.

The software operating on the computer system can perform many useful functions depending on the intended application. In one example, the data processing system may perform economic and financial modeling and planning, which, given specific sets of input data of interest, is commonly used to estimate or predict the performance and outcome of real systems. An economic-based system will have many variables and influences which determine its behavior. A model is a mathematical expression or representation which predicts the outcome or behavior of the system under a variety of conditions. In one sense, it is relatively easy to review historical data, understand its past performance, and state with relative certainty that the system's past behavior was indeed driven by the historical data. A much more difficult task, but one that is extremely valuable, is to generate a mathematical model of the system which predicts how the system will behave, or would have behaved, with different sets of data and assumptions. While forecasting and backcasting using different sets of input data is inherently imprecise, i.e., no model can achieve 100% certainty, the field of probability and statistics has provided many tools which allow such predictions to be made with reasonable certainty and acceptable levels of confidence.

In its basic form, the economic model can be viewed as a predicted or anticipated outcome of a mathematical expression, as driven by a given set of input data and assumptions. The input data is processed through the mathematical expression representing either the expected or current behavior of the real system. The mathematical expression is formulated or derived from principles of probability and statistics, often by analyzing historical data and corresponding known outcomes, to achieve a best fit of the expected behavior of the system to other sets of data, both in terms of forecasting and backcasting. In other words, the model should be able to predict the outcome or response of the system to a specific set of data being considered or proposed, within a level of confidence, or an acceptable level of uncertainty. As a simple test of the quality of the model, if historical data is processed through the model and the prediction of the model, using the historical data, is closely aligned with the known historical outcome, then the model is considered to have a high confidence level over the interval. The model should then do a good job of forecasting outcomes of the system to different sets of input data.

Figure 1:
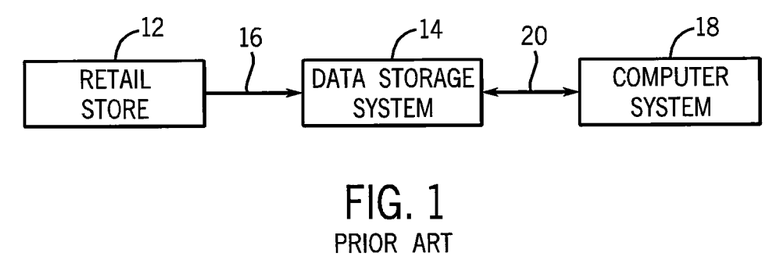
FIG. 1 is a block diagram of a prior art data processing system.

For the economic model to perform up to expectations, it must have access to real data. In the retail business, the raw data typically comes from the actual retail transactions. FIG. 1 illustrates such a retail data gathering and economic modeling system. Retail store 12 sells merchandise and/or services. The sales data may come in the form of stock keeping unit (SKU) data read from the universal product code (UPC) label or barcode associated with the product. In the case of a grocery store, when the food item is passed over the check-out scanner, the UPC label is read and the product is identified. The store's computer system retrieves a significant amount of information associated with the product, including price for the check-out process.

The data associated with the sale of products in the customer transaction is recorded and sent to data storage system 14 by way of communication channel 16. Data storage system 14 may be a mass storage device, or a server connected to a mass storage device, which contains a relational database or other file structure convenient for storing large amounts of data. The mass storage device can be magnetic or optical disk drive(s). Retail store 12 may conduct many thousands of transactions each day, each transaction potentially involving many products, and each product having 30 or more data fields. The raw data generated by retail store 12 over time can be massive. Data storage system 14 may be required to store data for many retail stores, and if the data storage system is operated by an independent data processing vendor, it may have to store data for many different retailers and other business clients.

The economic model executes by way of software or computer programs running on computer system 18. The modeling software accesses data, processes the data, and generates reports, model parameters, or otherwise makes recommendations. To access the needed data, the modeling software operating on computer system 18 sends requests and receives data from data storage system 14 over communication channel 20. The data storage system 14 accesses the requested data and transmits the data over communication channel 20 back to computer system 18. The computer system 18 processes the retrieved data according to the algorithms of the economic model.

The data processing system has certain data throughput limitations or bottlenecks which slow down the execution of the economic model and generation of the reports and predicted outcomes of the system. The bottlenecks occur with communication channel 20 and the data access from data storage system 14.

The total raw dataset from retail store 12 is commonly stored in a relational database or other formal file structure. The modeling application running on computer system 18 makes requests for specific data components of the overall dataset in data storage system 14 via communication channel 20. Data storage system 14 identifies the storage location, retrieves the data from the storage location, and sends the requested data over communication channel 20 back to computer system 18.

One bottleneck arises from the large number of requests for data components that must be processed by data storage system 14. The central processing unit (CPU) on data storage system 14 must make requests into the relational database file structure to retrieve each data component or segment. These database accesses take time to execute. In general, computer system 18 is capable of processing data more rapidly than data storage system 14 can locate and retrieve the data. A significant portion of the delays in the software execution can be attributed to database acquisition latency.

Another bottleneck arises from the massive amounts of data traversing communication channel 20. Communication channel 20 has a finite bandwidth and can transmit only so much data over a given time frame. The problem becomes acute when multiple modeling applications running on computer system 18 all try to access their data over communication channel 20 within a common time frame. The issue is even more apparent when multiple applications running on multiple computer systems like 18 all try to use communication channel 20 simultaneously.

The massive amounts of data being accessed from the relational database or other formal file structure on data storage system 14, and then being transferred over communication channel 20 to feed the multiple economic modeling applications, slows down the software execution and reduces the model efficiency. The increased execution time of the software translates into higher costs of operating the computer system and generating the needed model outputs. In practice, the users are often limited in the frequency that they can run the economic modeling applications because of the time and cost involved in accessing and processing the data.

A need exists for an efficient data storage and acquisition process to run high data throughput processing applications such as economic modeling.

SUMMARY OF THE INVENTION

In one embodiment, the present invention is a computer system for performing enterprise modeling. A data organizer is coupled for receiving a primary set of data. The data organizer parses the primary set of data into predefined sets of data components according to processing requirements of a plurality of enterprise models. A plurality of data sources are coupled to an output of the data organizer. Each of the plurality of data sources store at least one of the predefined sets of data components from the data organizer. A plurality of data processing systems each execute at least one of the plurality of enterprise models. A plurality of communication channels respectively are coupled between the plurality of data sources and the plurality of data processing systems for routing the predefined set of data components to the data processing system which executes a corresponding one of the plurality of enterprise models.

In another embodiment, the present invention is a method of accessing data for performing enterprise modeling comprising parsing a primary set of data into predefined sets of data components according to processing requirements of a plurality of enterprise models, storing the predefined sets of data components in a plurality of data sources, executing at least one of the plurality of enterprise models on each of a plurality of data processing systems, and routing the predefined sets of data components from the plurality of data sources to the plurality of data processing systems which execute the corresponding enterprise models.

In another embodiment, the present invention is a data processing system comprising a data organizer coupled for receiving a primary set of data. The data organizer organizes a set of data components from the primary set of data. A data source is coupled to the data organizer for storing the set of data components. A data processing system is coupled to the data source for receiving and processing the set of data components.

In another embodiment, the present invention is a computer system for data processing comprising a data organizer coupled for receiving a primary set of data. The data organizer organizes a set of data components from the primary set of data. A plurality of data sources communicate with the data organizer and store the set of data components. A plurality of data processing systems are each coupled to one or more of the plurality of the data sources for receiving and processing the sets of data components through an application.

In another embodiment, the present invention is a method of accessing data in a data processing system comprising parsing a primary set of data into a first set of data components according to a first application, storing the first set of data components in a data source, and routing the first set of data components from the data source to a data processing system for executing the first application.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 2:
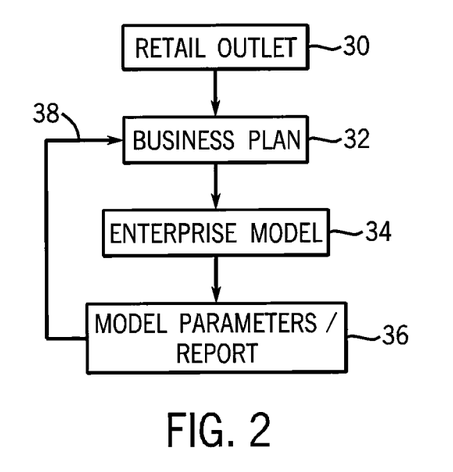
FIG. 2 is a block diagram of a business model using economic or enterprise modeling to run its operations.

Referring to FIG. 2, retail outlet (retailer) 30 has certain product lines or services available to customers as part of its business plan. The terms products and services are used interchangeably in the present discussion. Retailer 30 may be a food store chain, general customer product retailer, drug store, discount warehouse, department store, specialty store, service provider, etc. A store may be a single location, or a chain or logical group of stores.

Retailer 30 has the ability to set pricing, order inventory, run promotions, arrange its product displays, collect and maintain historical sales data, and adjust its strategic business plan. The management team of retailer 30 is held accountable for market share, profits, and overall success and growth of the business. While the present discussion will center around retailer 30, it is understood that the economic modeling tools and data processing system described herein are applicable to other large enterprises and businesses having similar goals, constraints, and needs.

Retailer 30 has business or operational plan 32. Business plan 32 includes many planning, analyzing, and decision-making steps and operations. Business plan 32 gives retailer 30 the ability to evaluate performance and trends, make strategic decisions, set pricing, order inventory, formulate and run promotions, hire employees, expand stores, add and remove product lines, organize product shelving and displays, select signage, and the like. Business plan 32 allows retailer 30 to analyze data, evaluate alternatives, run forecasts, and make operational decisions. Retailer 30 can change business plan 32 as needed. As one important tool to allow retailer 30 to execute on business plan 32, the management team needs accurate economic models.

Economic and financial modeling has many uses and applications; it is an important business tool which allows companies to conduct business planning, forecast demand, manage supply chains, control inventory, manage manufacturing, model revenue, and optimize price and profit. One emerging area in which modeling has exceptional promise is in the retail sales environment. Grocery stores, general merchandise stores, specialty shops, and other retail outlets face stiff competition for limited customers and business. Most if not all retail stores make every effort to maximize sales, volume, revenue, and profit. Economic modeling can be a very effective tool in helping the store owners and managers achieve these goals.

Economic modeling is also applicable to many businesses such as manufacturing, distribution, medicine, chemicals, financial markets, investing, exchange rates, inflation rates, pricing of options, value of risk, research and development, and the like. In the face of mounting competition and high expectations from investors, most if not all businesses must look for every advantage they can muster in maximizing market share and profits. The ability to forecast demand, in view of pricing and promotional alternatives, and to consider other factors which materially affect overall revenue and profitability is vital to the success of the bottom line, and to the fundamental need to not only survive but to prosper and grow.

From business plan 32, retailer 30 provides certain observable data and assumptions to enterprise model 34. Enterprise model 34 includes the concept of economic models as well as process, scheduling, inventory, optimization, supply, demand, and other decision-based modeling. Retailer 30 receives back specific forecasts and predictions from enterprise model 34. The model performs a series of complex calculations and mathematical operations to predict and forecast the business functions in which retailer 30 is most interested. The output of enterprise model 34 is a report, chart, table, or other analysis 36, which represents the model's forecasts and predictions based on the model parameters and the given set of data and assumptions. Report 36 is made available to business plan 32 by link 38 so that retailer 30 can make operational decisions.

In the normal course of retail business, retailer 30 collects a significant amount of data from sales of products and services. Depending on the business, the data can come from many different sources. The source of data may be from supply chain, inventory control, manufacturing data, and the like. For example, a customer patronizes a store, makes one or more product selections, places the items in a basket, and proceeds to the checkout counter. The contents of the basket containing one or more products is a retail transaction. The items are scanned through the checkout and the customer pays for the merchandise.

The process of scanning each and every item creates transaction log (TLOG) data. One specific product purchase corresponds to one line item. The TLOG data contains multiple line items for each retail transaction. Each line item of the customer transaction may contain 30 or more data fields, segments, or objects associated with the line item. In one embodiment, each line item includes data fields for store number, product number, time of transaction, transaction number, quantity, current price, profit, promotion number, customer number, etc. The store number identifies specific store; product number identifies a product; time of transaction includes date and time of day; quantity is the number of units of the product; current price (in US dollars) can be the regular price, reduced price, or higher price in some circumstances; profit is the difference between current price and cost of selling the item; promotion number identifies any promotion for the product, e.g., flyer, ad, sale price, coupon, rebate, end-cap, etc.; customer number identifies the customer by type, class, region, or individual, e.g., discount card holder, government sponsored or under-privileged, volume purchaser, corporate entity, preferred customer, or special member.

Each transaction may contain many line items. There are likely thousands of transactions (customer baskets) per day per store. The TLOG data may contain millions of line item entries for retailer 30 per store per day. The overall amount of data becomes massive when multiplied by the number of stores and the number of days. Yet, the TLOG data remains one of the most accurate, observable, and granular sources of product information from which to create enterprise models based on actual retail transactions within the store.

Figure 3:
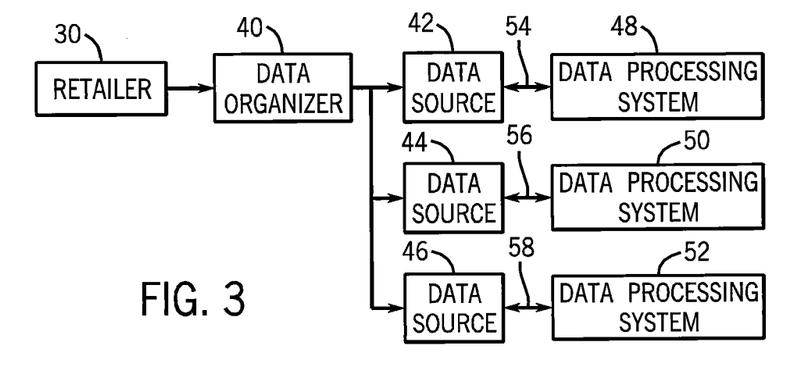
FIG. 3 is a block diagram of a retailer transmitting data to data storage systems for use by data processing systems.

In FIG. 3, the totality of TLOG data from retailer 30 is sent to data organizer 40. Data organizer 40 represents a data processing function or computer program which organizes the TLOG data as described below. Data organizer 40 may execute on a server within retailer 30, or it may reside with a third party service provider who is responsible for organizing, storing, tracking, and/or modeling the data on behalf of retailer 30.

Data organizer 40 parses, formats, indexes, and organizes the primary TLOG data from retailer 30 for storage on data sources 42, 44, and 46. The data is organized by data organizer 40 customized according to the job to be performed by the data processing system. The parsing process involves extracting certain portion(s) of the TLOG data stream and creating separate predetermined or predefined subsets of the primary dataset. Data sources 42, 44, and 46 each represent server(s) or mass storage device(s), e.g., magnetic or optical disk drives, which have the capacity to store large quantities of data. Data sources 42-46 may be individual mass storage devices or logical file locations with one mass storage device. In another embodiment, data sources 42-46 may be implemented in random access memory (RAM), shared memory segments, and other electronic memory devices used in or with a digital computer system.

Data processing systems 48, 50, and 52 access the data from data sources 42, 44, and 46 over high-speed communication channels 54, 56, and 58, respectively. Data processing systems 48, 50, and 52 each represent servers or computer systems running software applications.

Figure 4:
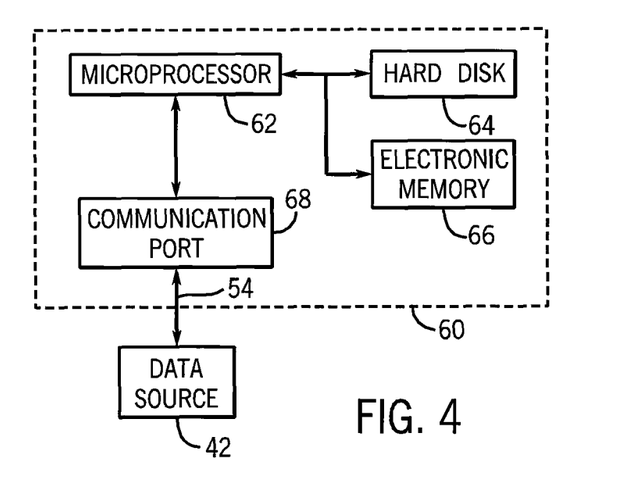
FIG. 4 is a computer system for executing the enterprise models.

A general purpose computer 60 is shown in FIG. 4 representing one embodiment of data processing system 48, 50, or 52. Computer 60 includes central processing unit or microprocessor 62, mass storage device or hard disk 64, electronic memory 66, and communication port 68. In the case of data processing system 48, communication port 68 connects to data source 42 by way of high-speed communication channel 54.

Data sources 42, 44, and 46, and data processing systems 48, 50, and 52, and data organizer 40, may be components of a computer communication network having dedicated communication links between the multiple computers. Alternatively, these system components may interconnect through an open architecture system such as the World Wide Web, commonly known as the Internet.

In one embodiment, enterprise model 34 embodies application software or computer program residing on computer 60. The software is originally provided on computer readable media, such as compact disks (CDs), or downloaded from a vendor website, and installed on the computer. In one case, enterprise model 34 can be executed directly on computer 60, which may be located in the facilities of retailer 30. Retailer 30 interacts with computer 60 through a user control panel, which may take the form of a local computer terminal, to run enterprise model 34 and generate report 36. Alternatively, retailer 30 uses a local computer system to access enterprise model 34 remotely, e.g., through the computer communication network using a website contained on hard disk 64. Retailer 30 can make requests of a third party vendor who in turn runs enterprise model 34 and generates report 36 on behalf of the retailer. The requests to generate report 36 may be made to the third party vendor through the website or other communication medium.

Figure 5:
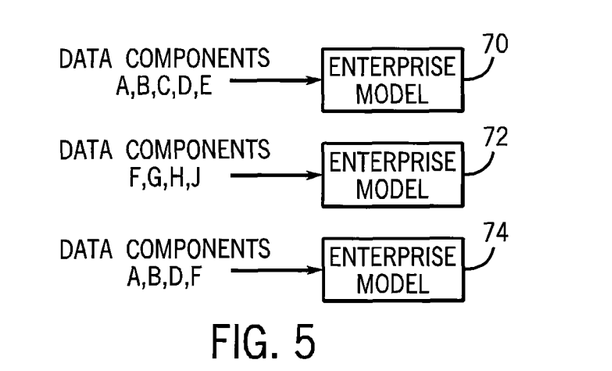
FIG. 5 illustrates enterprise models receiving data components.

As stated, data processing systems 48, 50, and 52 utilize software programs running one or more enterprise models 34. Depending on the needs of retailer 30, a variety of individual and specific enterprise models can be executed to generate reports, estimate modeling parameters, predict sales forecasts, analysis of historical trends, plan seasonal promotions, and the like. As shown in FIG. 5, enterprise model 70 executes on data processing system 48. In one example, enterprise model 70 may solve for one or more modeling parameters. Enterprise model 72 executes on data processing system 50, and may run supply chain forecasts. Enterprise model 74 executes on data processing system 52, and predicts sales and inventory.

The different enterprise models 70, 72, and 74 each utilize specific and possibly different components or sets of the primary TLOG data. As noted above, the main TLOG dataset has a composite set of data components or parameters for each line item of the retail transaction. However, the different enterprise models may use only a portion of the total dataset from each line item of the product sales. Assume the main TLOG dataset is generically identified by the bulk data components A, B, C, D, . . . , X, Y, and Z for each line item, i.e., each line item of the primary TLOG dataset contains bulk data components A-Z. In one embodiment, data component A may be the retailer or client, data component B may be the store, data component C may be the product, data component D may be time, and so on.

As the algorithm of each enterprise model is formulated and written in software code, the specific data components of the primary TLOG dataset necessary to run each particular model will be defined and known. For example, as shown in FIG. 5, enterprise model 70 executing on data processing 48 may use only the predefined set of data components A, B, C, D, and E; enterprise model 72 running on data processing system 50 may use only the predefined set of data components F, G, H, and J; enterprise model 74 running on data processing system 52 may use only the predefined set of data components A, B, D, and F. Other enterprise models may required the entire TLOG dataset, in which case the predefined set of data components is A-Z. In any case, each enterprise model will need only a specific and predefined set, subset, or portion of the primary TLOG dataset to execute on its own data processing system.

The predefined data components needed for each enterprise model are contained in a configuration file stored on data organizer 40. The configuration file can be created and updated as the enterprise models are added, deleted, and changed. As the TLOG data from retailer 30 is sent to data organizer 40, the data organizer parses, sorts, and formats the TLOG data into the constituent groups of data components needed for the individual enterprise models running on the data processing systems. As each line item of the main TLOG dataset containing primary data components A-Z from retailer 30 is received by data organizer 40, using the configuration file, data organizer 40 will recognize that only data components A, B, C, D, and E will be used by enterprise model 70 running on data processing system 48. Data organizer 40 parses or extracts the data components A, B, C, D, and E from the main TLOG dataset and stores them in a file location on data source 42. The file location will be a data structure stored in the memory or hard drive of data source 42. Accordingly, data source 42 contains a file location with only the predefined set of data components A, B, C, D, and E which are needed by enterprise model 70 running on data processing system 48 to perform its calculations. Likewise, data organizer 40 uses the configuration file to parse the predefined data components F, G, H, and J which are needed by enterprise model 72 from the primary TLOG dataset. The data components are stored in a file location in the memory of data source 44. Data source 44 thus contains a file location with only the data components F, G, H, and J as needed by enterprise model 72 running on data processing system 50 to perform its calculations. Data organizer 40 also causes the data components A, B, D, and F which are used by enterprise model 74 to be parsed out of the main TLOG dataset and stored on data source 46 as a data structure in computer memory. Data source 46 contains a file location with only the data components A, B, D, and F which are needed by enterprise model 74 running on data processing system 52 to perform its calculations.

The data components parsed and stored may not be the same for each line item, and not all line items are necessarily parsed. The configuration file may use a sampling process of the TLOG data stream. The data components extracted by data organizer 40 will be dependent on and customized to the requirements of the enterprise model running on the respective data processing system.

Data organizer 40 may also store the original and total TLOG dataset with data components A-Z in a relational database on one of the data sources or other mass storage device for other purposes and uses, e.g., backup to recreate the predefined set of data components should the data sources become corrupt.

The data components are stored in data sources 42-46 in a binary file structure, binary tree structure, or text file. The binary file structure is formatted to efficiently store the data. The file structure format is known to the corresponding data processing system. In one embodiment, the data components are stored in repeating fixed length fields in a known order. The binary file structure for data source 42 may be ABCDEABCDEABCDE . . . ; the binary file structure for data source 44 may be FGHJFGHJFGHJFGHJ . . . ; and the binary file structure for data source 46 may be ABDFABDFABDFABDF . . . . The binary file structure can be accessed very rapidly by reading large data blocks of the corresponding data source. The binary file structure contains only the information needed by the respective data processing system to perform its calculations. Moreover, each data processing system has a dedicated communication channel to the corresponding data source containing the needed TLOG data.

Figure 6:
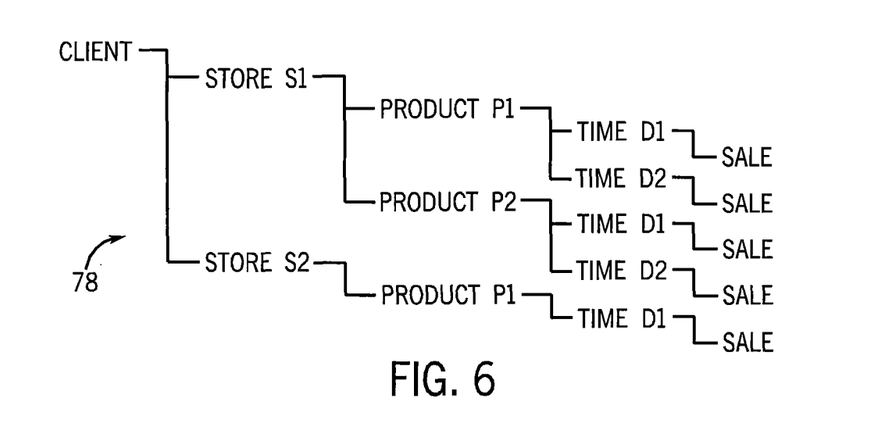
FIG. 6 illustrates the hierarchical file structure of a data source.

Another file structure for storing the data components in data sources 42-46 is shown in FIG. 6 as hierarchical file structure 78. The hierarchical file structure 78 breaks down the data components in organizational levels. The data component "retailer" has subordinate levels for store S1 and store S2. Store S1 sells products P1 and P2. Products P1 and P2 were sold on time D1 and time D1. Store S2 sells product P1 on time D1. The actual sale data is recorded at the end of the hierarchical file structure. The hierarchical file structure shown in FIG. 6 can be viewed as retailer/store/product/time/sale. From the above example of the file location on data source 42, the hierarchical file structure can be viewed as A/B/C/D/E. Likewise, the hierarchical file structure for the file location on data source 44 can be viewed as F/G/H/J, and the hierarchical file structure for the file location on data source 46 can be viewed as A/B/D/F. The hierarchical file structure is organized for rapid access by the data processing system according to its data requirements. The data sources can rapidly read down each path of the hierarchical file structure to get the information for processing by the enterprise models. Each data source 42-46 may have a unique hierarchical file structure as determined by and customized to the data needs of the data processing system(s) that it is supporting.

In another embodiment, the data organizer 40 may store all bulk data A-Z in one or more of the selected data sources. The data organizer parses the bulk data A-Z into one or more hierarchical file structures so the hierarchical paths quickly lead to and access only the data needed by the enterprise model. A first hierarchical path may contain the data used by enterprise model 70, a second hierarchical path may contain the data used by enterprise model 72, and a third hierarchical path may contain the data used by enterprise model 74. Each hierarchical path within the file structure is customized for the end application.

When enterprise model 70 makes a request for its data components, data source 42 sends a large data block for a large number of sets of data components, i.e., $A_1B_1C_1D_1E_1A_2B_2C_2D_2E_2A_3B_3C_3D_3E_3$ . . . , over dedicated communication channel 54 to data processing system 48. Data components $A_i$, $B_i$, $C_i$, $D_i$, $E_i$ correspond to one line item of the TLOG dataset. Likewise, when enterprise model 72 needs its data components, data source 44 sends a large data block for a large number of sets of data components, i.e., $F_1G_1H_1J_1F_2G_2H_2J_2F_3G_3H_3J_3F_4G_4H_4J_4$ . . . , over dedicated communication channel 56 to data processing system 50. Data components $F_i$, $G_i$, $H_i$, $J_i$ correspond to one line item of the TLOG dataset. When enterprise model 74 needs its data components, data source 46 sends a large data block for a large number of sets of data components, i.e., $A_1B_1D_1F_1A_2B_2D_2F_2A_3B_3D_3F_3A_4B_4D_4F_4$ . . . , over dedicated communication channel 56 to data processing system 52. Data components $A_i$, $B_i$, $D_i$, $F_i$ correspond to one line item of the TLOG dataset. The data processing systems 48-52 will each have the needed data to perform the necessary calculations. Data processing system 48 processes multiple sets of the data components ABCDE according to its algorithms to generate the intended model output. Likewise, data processing system 50 processes multiple sets of the data components FGHJ according to its algorithms to generate the intended model output. Data processing system 52 processes multiple sets of the data components ABDF according to its algorithms to generate the intended model output.

The combination of the reading only the required data in large blocks, from an efficient file format, over a dedicated communication channel greatly increases the effective data throughput and reduces the execution time of the enterprise model. The enterprise model performs its operation more quickly because it spends less time waiting for data transfer and the model output is available sooner. The enterprise model reports can be run more frequently providing valuable information to retailer 30 in a timely and cost effective manner.

Figure 7:
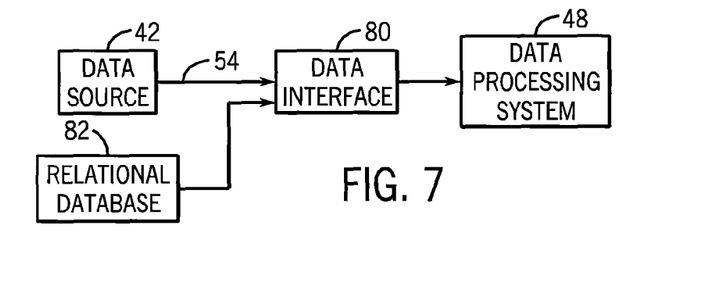
FIG. 7 illustrates a data interface block for the data processing system.

Each data processing system may have a data interface, which is configured to receive data from different sources and convert the data into a standard format. One example of the data interface is shown in FIG. 7. Data processing system 48 uses data interface 80 to receive data components from either data source 42 or from a relational database 82 containing the entire TLOG dataset. If data source 42 or communication channel 54 fails or goes down, then the same data can be accessed from relational database 82, albeit at a slower rate. Data interface 80 allows the system to be made robust against communication and hardware failures as the data processing system can utilize alternative paths to access the needed data. Data interface 80 converts the data, if necessary, to the data stream format that data processing system 48 is expecting to receive.

Figure 8:
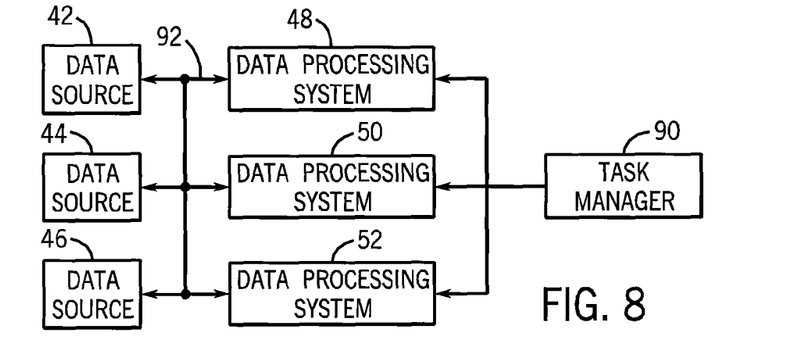
FIG. 8 illustrates the data processing systems accessing multiple data sources.

Another data transfer configuration is shown in FIG. 8. In this case, data organizer 40 creates a copy of the corresponding data component file needed by each enterprise model on each of the data sources 42, 44, and 46. In addition, each of the enterprise models 70-74 are loaded into each of the data processing systems 48, 50, and 52. Task manager 90 assigns jobs or tasks for the data processing systems 48-52. Task manager 90 divides large jobs into smaller jobs that may be distributed across the data processing system. Task manager 90 controls access to data and coordinates the data between the individual jobs. In one case, task manager 90 may assign data processing system 48 to execute enterprise model 70, data processing system 50 to execute enterprise model 72, and data processing system 52 to execute enterprise model 74.

Task manager 90 instructs the data processing systems to use specific paths or links of communication network 92 to access data sources 42-46. In one scenario, task manager 90 instructs data processing system 48 to get its data from data source 42, data processing system 50 to get its data from data source 44, and data processing system 52 to get its data from data source 46. Communication network 92 may be a shared communication network, or may have separate dedicated communication channels routed from each data source to each data processing system.

Figure 9:
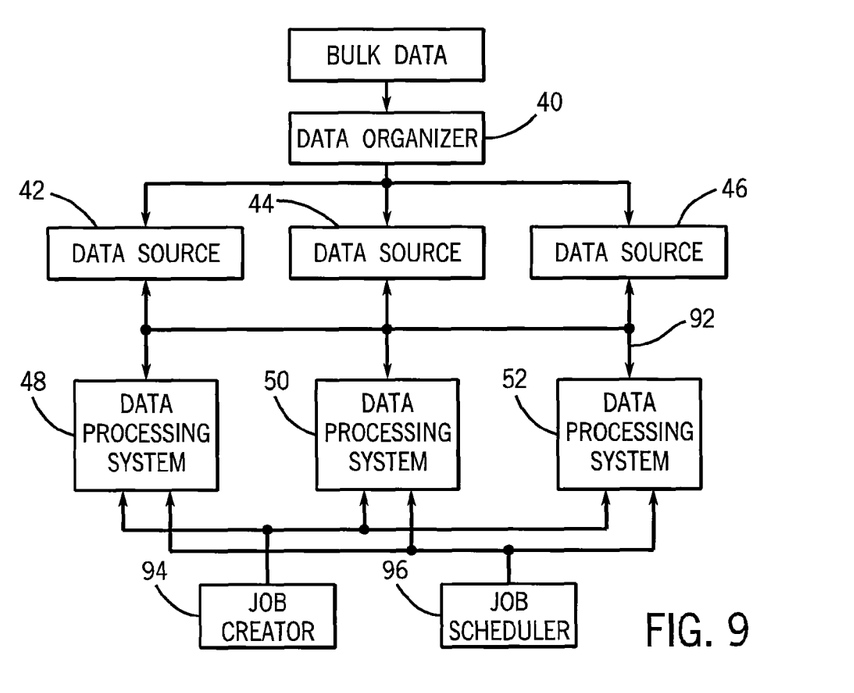
FIG. 9 illustrates the data processing system with job creator and job scheduler.

Task manager 90 schedules the jobs involved with executing the specific instructions or tasks associated with the enterprise models 70-74. Task manager 90 has the ability to re-route jobs based on demand, capacity, backlogs, and throughput of the overall system. FIG. 9 illustrates the task manager function being performed by job creator 94 and job scheduler 96. Job creator 94 identifies the job (enterprise model or portion thereof) to be run according to user demand or predetermined sequence. Job creator 94 further matches the job to the data processing system and the data source according to available system capacity. Job scheduler 96 starts and stops the jobs executing one the matched data processing system to maximize the efficiency of the system.

In the event that one or more of the data processing systems goes down, or if one or more the data sources or communication channels goes down, or if retailer 30 requests more runs of one enterprise model over another, then task manager 90 can reassign the data processing systems and/or the data sources as needed to optimize the processing and throughput of the data processing system. Data processing system 48 can be assigned to execute any one of the enterprise models 70, 72, or 74. Moreover, since the system is duplicative, i.e., all predefined sets of data components are stored on each data source and all enterprise models are loaded on each data processing system, task manager 90 can instruct data processing system 48, according to the enterprise model it is running, to get its data from any one of the data sources 42, 44, or 46. Likewise, data processing system 50 can be assigned to execute any one of the enterprise models 70, 72, or 74. Task manager 90 can instruct data processing system 50 to get its data from any one of the data sources 42, 44, or 46. Data processing system 52 can be assigned to execute any one of the enterprise models 70, 72, or 74. Task manager 90 can instruct data processing system 52 to get its data from any one of the data sources 42, 44, or 46.

The data transfer is fast, efficient, and robust as each data processing system gets only the data it needs, in a large data block, over dedicated or networked communication channels, and potentially from multiple data sources. The data processing systems can execute their respective enterprise models with order(s) of magnitude higher performance and less time than can be done through the prior art data communication bottlenecks as noted in FIG. 1. Retailer 30 can receive their modeling output more quickly and can run the models more frequently at a lower per unit cost using the data organization and transfer techniques described herein.

Figure 10:
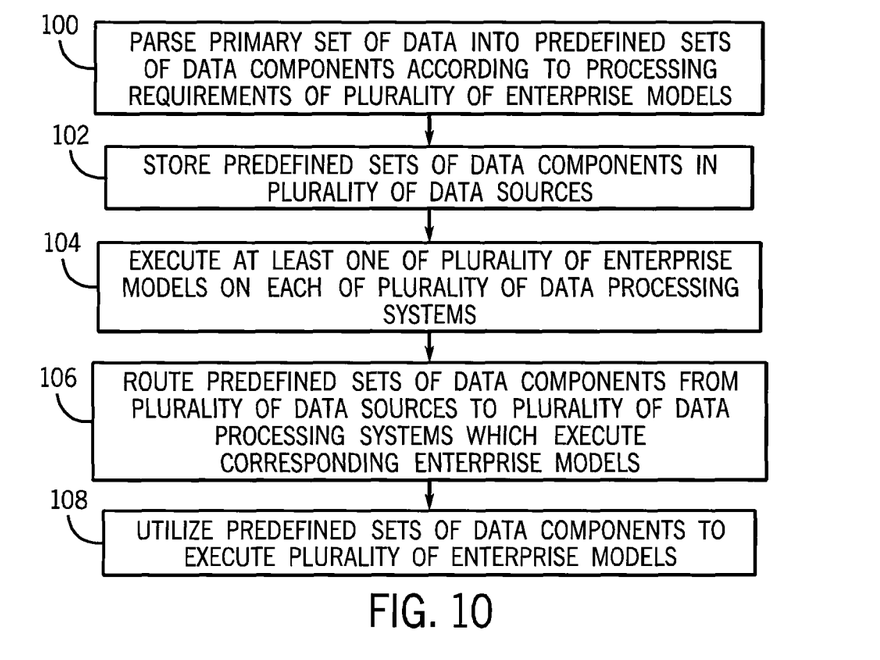
FIG. 10 illustrates the methodology of accessing data for performing enterprise modeling in the data processing system.

The methodology of accessing data for performing enterprise modeling in the data processing system as described herein is shown in FIG. 10. Step 100 parses a primary set of data into predefined sets of data components according to processing requirements of a plurality of enterprise models. Step 102 stores the predefined sets of data components in a plurality of data sources. Step 104 executes at least one of the plurality of enterprise models on each of a plurality of data processing systems. Step 106 routes the predefined sets of data components from the plurality of data sources to the plurality of data processing system which execute the corresponding enterprise models. Step 108 utilizes the predefined sets of data components to execute the plurality of enterprise models.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer system for performing statistical modeling using transactional data from retail sales, comprising:
    a data organizer coupled for receiving a primary set of transactional data from retail sales, wherein the data organizer parses the primary set of transactional data into predefined sets of data components according to processing requirements of a plurality of statistical models;
    a plurality of data sources each including a memory device or mass storage device and coupled to an output of the data organizer, wherein each of the plurality of data sources store at least one of the predefined sets of data components from the data organizer;
    a plurality of data processing systems each including a respective processor and executing at least one of the plurality of statistical models; and
    a plurality of communication channels respectively coupled between the plurality of data sources and the plurality of data processing systems for routing the predefined set of data components to the data processing system which executes a corresponding one of the plurality of statistical models, wherein each of the predefined sets of data components includes only data which is used by the corresponding one of the plurality of statistical models.

2. The computer system of claim 1, wherein a first one of the plurality of statistical models uses a first predefined set of data components.

3. The computer system of claim 2, wherein the data organizer extracts the first predefined set of data components from the primary set of transactional data.

4. The computer system of claim 3, wherein the first predefined set of data components is stored on a first one of the plurality of data sources.

5. The computer system of claim 4, wherein the first predefined set of data components is organized on the first one of the plurality of data sources as a data structure in computer memory.

6. A method for performing data processing, comprising:
    creating, by a data organizer coupled for receiving a primary set of data from a transactional sales log, predefined sets of data components from the primary set of data according to processing requirements of a plurality of enterprise models;
    storing one of the predefined sets of data components in each of a plurality of data sources, the plurality of data sources each including a memory device or mass storage device and coupled to the data organizer;
    executing an application on each of a plurality of data processing systems, the plurality of data processing systems each including a respective processor; and
    routing the predefined sets of data components from the plurality of data sources through a plurality of communication channels to the plurality of data processing systems which executes a corresponding one of the plurality of enterprise models, the plurality of communication channels respectively coupled between the plurality of data sources and the plurality of data processing systems.

7. The method of claim 6, including utilizing a first predefined set of data components to execute a first one of the plurality of enterprise models.

8. The method of claim 7, including storing the first predefined set of data components in a first one of the plurality of data sources.

9. The method of claim 8, wherein the first predefined set of data components is stored on the first one of the plurality of data sources as a binary file or a hierarchical file.

10. The method of claim 8, wherein the first predefined set of data components is stored on the first one of the plurality of data sources as a data structure in computer memory.

11. The method of claim 8, including routing the first predefined set of data components from the first one of the plurality of data sources over a first one of the plurality of communication channels to a first one of the plurality of data processing systems.

12. A computer system for performing data processing, comprising:
   a data organizer coupled for receiving a primary set of data from a transactional sales log, wherein the data organizer creates predefined sets of data components from the primary set of data according to processing requirements of a plurality of enterprise models;
   a plurality of data sources each including a memory device or mass storage device and coupled to the data organizer, wherein each data source stores one of the predefined sets of data components;
   a plurality of data processing systems each including a respective processor and each executing an application; and
   a plurality of communication channels respectively coupled between the plurality of data sources and the plurality of data processing systems for routing the predefined sets of data components to the plurality of data processing systems which executes a corresponding one of the plurality of enterprise models.

13. The computer system of claim 12, wherein a first one of the plurality of enterprise models uses a first predefined set of data components.

14. The computer system of claim 13, wherein the data organizer extracts the first predefined set of data components from the primary set of data.

15. The computer system of claim 14, wherein the first predefined set of data components is stored on a first one of the plurality of data sources.

16. The computer system of claim 15, wherein the first predefined set of data components is organized on the first one of the plurality of data sources as a data structure in computer memory.

17. A computer program product usable with a programmable computer processor having a computer readable program code embodied therein, comprising:
   computer readable program code which creates in a data organizer coupled for receiving a primary set of data from a transactional sales log, predefined sets of data components from the primary set of data according to processing requirements of a plurality of enterprise models;
   computer readable program code which stores one of the predefined sets of data components in each of a plurality of data sources, the plurality of data sources each including a memory device or mass storage device and coupled to the data organizer;
   computer readable program code which executes an application on each of a plurality of data processing systems, the plurality of data processing systems each including a respective processor; and
   computer readable program code which routes the predefined sets of data components from the plurality of data sources through a plurality of communication channels to the plurality of data processing systems which executes a corresponding one of the plurality of enterprise models, the plurality of communication channels respectively coupled between the plurality of data sources and the plurality of data processing systems.

18. The computer program product of claim 17, including computer readable program code which utilizes a first predefined set of data components to execute a first one of the plurality of enterprise models.

19. The computer program product of claim 18, including computer readable program code which stores the first predefined set of data components in a first one of the plurality of data sources.

20. The computer program product of claim 19, wherein the first predefined set of data components is stored on the first one of the plurality of data sources as a binary file or a hierarchical file.

21. The computer program product of claim 19, wherein the first predefined set of data components is stored on the first one of the plurality of data sources as a data structure in computer memory.

22. The computer program product of claim 19, including computer readable program code which routes the first predefined set of data components from the first one of the plurality of data sources over a first one of the plurality of communication channels to a first one of the plurality of data processing systems.

23. A computer system for data processing, comprising:
   means for creating predefined sets of data components, wherein the means for creating includes a data organizer coupled for receiving a primary set of data from a transactional sales log, wherein the data organizer creates the predefined sets of data components from the primary set of data according to processing requirements of a plurality of enterprise models;
   means for storing the predefined sets of data components, wherein the means for storing includes a plurality of data sources each including a memory device or mass storage device and coupled to the data organizer, wherein each data source stores one of the predefined sets of data components;
   a plurality of data processing systems each including a respective processor and each executing an application; and
   means for routing the predefined sets of data components from the plurality of data sources to the plurality of data processing systems, wherein the means for routing includes a plurality of communication channels respectively coupled between the plurality of data sources and the plurality of data processing systems for routing the predefined sets of data components to the plurality of data processing systems which executes a corresponding one of the plurality of enterprise models.

24. The computer system of claim 23, wherein a first predefined set of data components is stored on a first one of the plurality of data sources as a binary file or a hierarchical file.

25. The computer system of claim 23, wherein a first predefined set of data components is stored on a first one of the plurality of data sources as a data structure in computer memory.

* * * * *